A. K. Rider,
Liquid Meter.
No. 98,634.    Patented Jan. 4, 1870.

Witnesses.    Inventor.

UNITED STATES PATENT OFFICE.

A. K. RIDER, OF ELIZABETH, NEW JERSEY.

IMPROVEMENT IN LIQUID-METERS.

Specification forming part of Letters Patent No. 98,634, dated January 4, 1870.

*To all whom it may concern:*

Be it known that I, ALEXANDER K. RIDER, of the city of Elizabeth, in the county of Union and State of New Jersey, have invented certain new and useful Improvements in Valves and Pistons, of which the following is a specification.

My invention may be employed in steam-engines and various other varieties of machinery in which fluids are controlled by valves, but is intended more particularly for use in water-meters. I will describe it as being so used.

I employ a valve which is cylindrical, and which has both an axial reciprocating motion and a partly-turning motion. The valve is at the same time a valve and a piston—that is to say, it receives the pressure of the fluid at one end and moves axially in obedience to such pressure, and then, after arriving at the end of its longitudinal motion, the relative pressures on the ends become changed, and it yields to a superior force in the opposite direction and moves back to its original position.

I will first describe what I consider the best means of carrying out my invention, and will afterward designate the points which I believe to be new.

The accompanying drawings form a part of this specification.

Figure 1:
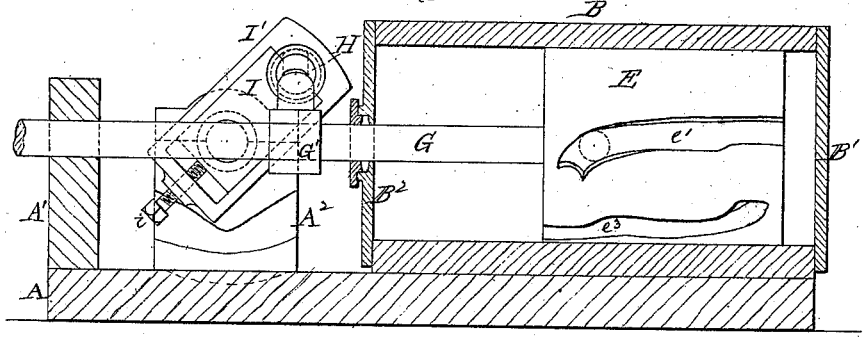
Figure 2:
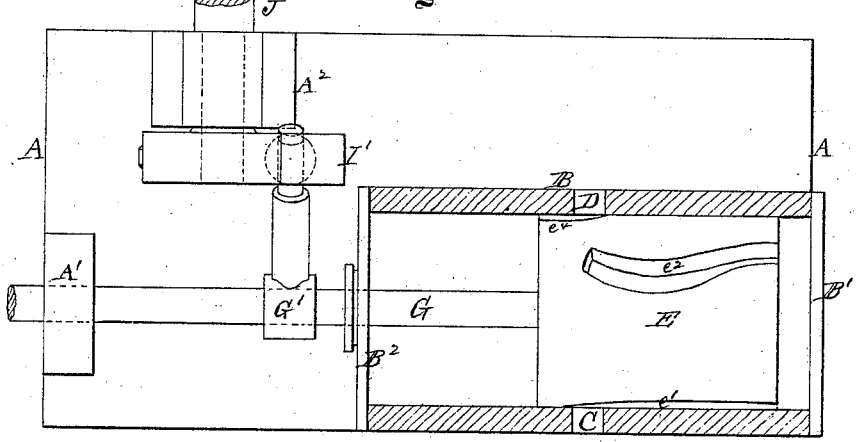
Figure 3:
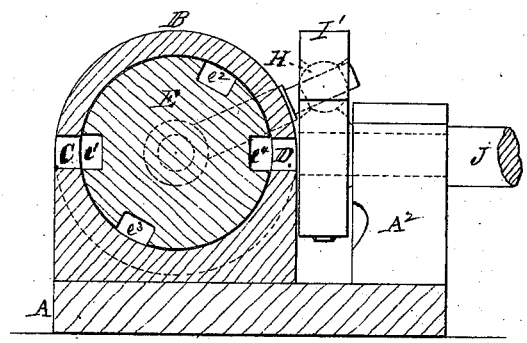

Figure 1 is a central longitudinal section. Fig. 2 is a plan view with the upper half of the cylinder removed, and Fig. 3 is a cross-section.

Similar letters of reference indicate like parts in all the figures.

A is a bed-plate or strong support.

B is a fixed cylinder receiving water through the aperture C, and discharging it through the aperture D by the aid of pipes leading to reservoirs at different levels. (Not represented.) It will be understood that there is a greater pressure on the water entering through the aperture C than on that discharged through the aperture D, and that this pressure is made available in operating the meter. If the difference in pressure is sufficient, the motion of the meter may be made to drive other machinery, thus constituting it a water-engine; or by introducing other than water into the machine, as already intimated, make the machine a steam-engine, gas-meter, or any other analogous machine. It will of course be understood that modifications in the packing, connections, &c., may be made to adapt the device to other uses.

E is a piston, of cast-iron or other suitable material, having its exterior nicely finished in a cylindrical form, adapted to work tight and easy within the cylinder B. The greater portion of its surface may be packed with any approved packing to increase the perfection of the fit. This piston or cylindrical casting E serves as a piston and valve. The valve G serves as a piston-rod and valve-rod. It is firmly secured to the part E and moves with it, being guided through a support, A'.

G' is an arm firmly secured on the rod G in the position represented. Its cylindrical end is fitted in and adapted to slide endwise in a globe of brass or other suitable material, indicated by H. This globe is held free to turn in spherical bearings in a crank, I, which is firmly fixed on the revolving shaft J, supported in suitable bearings, $A^3$. This shaft J may carry a fly-wheel and gearing or other means of communicating its rotary motion to registering or other mechanism, (not represented,) but the connection of which with the machine will offer no difficulty to a good mechanic. The spherical bearing in the crank I is made half in the solid crank and the other half in the strap I', which surrounds the crank, and is tightened upon the spherical piece H by means of the screw $i$, as represented. Now, the peculiar connection of these parts is such that the rotation of the shaft J involves not only a longitudinal or axial motion of the piston and valve E, but also a partial rotation—that is to say, the arm G' being rigidly fixed on the rod G and standing always in the sphere H in the rotating crank I, it follows that at each rotation of the crank the piston and valve E moves axially to an extent equal to the throw of the crank, and also rolls or partially rotates in one direction and the other to an extent depending partly on the throw of the crank and partly on its distance from the rod G—that is to say, the crank I revolving in a plane parallel to the rod G, and at a uniform distance therefrom, the arm G' is alternately raised and lowered, and thus the piston and valve E are partially rolled or rocked in one direction and the other as the crank rotates.

Both ends of the cylinder B are tightly closed. The end or head through which the piston-rod G works I have marked B', and the opposite end B².

There are four peculiarly-curved channels on the generally-cylindrical surface on the valve and piston E, marked, respectively, $e'$ $e^2$ $e^3$ $e^4$. These channels serve as ports. The channels $e'$ and $e^3$ communicate with opposite ends of the cylinder. One or the other of these coincide with the induction-orifice C during the whole or a great portion of the time. The channels $e^2$ and $e^4$ correspondingly communicate with opposite ends of the cylinder, and coincide with the eduction-orifice D. These channels are curved to allow for the rolling motion of the valve and piston E, so as to keep the communication open as the motion progresses. The water flowing in through the aperture C enters the channel $e'$ and flows through it to the end of the cylinder B'. It increases the quantity of water there and forces the piston and valve E toward the opposite end, B². Meantime the water is escaping freely from that end B² through the channel $e^2$ and flowing out through the orifice D. The motion of the valve and piston E involves a turning of the crank J, and the construction is such that when the piston and valve E has reached the end of its stroke the crank I is rising rapidly and is rolling the part E. For a brief period at this time neither the induction-passage C nor the eduction-passage D is in communication with either of the ends of the cylinder—that is to say, the apertures C and D are presented against neither of the channels, but against the plain cylindrical portion of the part E, so that no water is admitted or discharged; but after the rolling motion has progressed a little farther the apertures C and D are put in communication with the other set of channels—that is to say, the aperture C commences to deliver water into the channel $e^3$, and thence to induce an accumulation of water at the end B², thus driving the piston and valve E in the opposite direction toward the end B'; and the same rolling motion of the part E has put the discharge-aperture D in communication, through the channel $e^4$, with the end B', so that the water there is now discharged freely. Thus the motion progresses and becomes continuous. The part E near the middle of its stroke has no appreciable rolling motion. At each end of its stroke it is rolling rapidly, and the parts being formed and arranged as represented, the combination of the rolling with the reciprocating motion induces a succession of changes in the flow of the water, flowing first into and then out of each end of the cylinder; and this action of the water induces, by means of the pressure, a continuation of the motion of the machine. If the pressure of the water is gentle, or if, as will be frequently the case, the machine is allowed to run as rapidly as the water can flow, the machine may work idly and perform simply as a water-meter, the difference in the pressure of the water at the two ends being only sufficient to overcome the friction of the parts here represented, and of a proper registering mechanism, which may be similar to that of an ordinary water-meter or gas-meter. If, on the other hand, the available pressure of the water to drive the machine is very great, and if the machine be restrained in its motion, so as to make such pressure properly available, the machine may be worked as an engine to give out power, and thus be made to drive a ventilating-fan, printing-press, or any other machinery.

I propose also to use the same machine as a pump, blower, or analogous device. To effect this it is necessary simply to apply a steam-engine or other suitable motor to rotate the shaft J continuously and with sufficient power, and to connect the passages C D with suitable pipes, through which the water, air, or other fluid is to be received and delivered.

I can prolong the rod G and place the arm G' and the crank at a greater distance from the cylinder. The action of the device will be the same, whatever the distance of the arm and crank; or I can bring the arm and crank nearer and attach the arm G' directly to the piston, making a corresponding aperture in the cylinder, changing the position of the crank, and modifying the channels $e'$ $e^2$, &c., to match.

I claim—

1. A reciprocating and partially-rotating piston, which performs the functions of a valve by its partial rotation, when operated, as represented, relatively to an inclosing-cylinder with suitable orifices and connections, substantially as herein described, and for the purposes set forth.

2. In combination with the valve and piston E $e'$ $e^2$ $e^3$ $e^4$, the spherical part H, arranged as represented, relatively to the crank I, arm G', and rod G, for the purposes herein set forth.

3. The combination of all the several parts, to wit, the cylinder B, with its induction and eduction apertures and proper connections, the reciprocating and partially-turning piston and valve E $e'$ $e^2$ $e^3$ $e^4$, the rigid connections G G', the crank and shaft I J, and the peculiar spherical bearings H, with the provision for allowing both the rolling motion and the end motion of the arm G' therein, and with means for adjusting the tightness of the hold upon the spherical bearings to compensate for wear, all as and for the purposes herein set forth.

In testimony whereof I have hereunto set my name in presence of two subscribing witnesses.

A. K. RIDER.

Witnesses:
C. C. LIVINGS,
MARION A. DOWD.